United States Patent [19]

Middleton

[11] Patent Number: 4,822,623

[45] Date of Patent: * Apr. 18, 1989

[54] PROCESS OF USING RENNET CASEIN FOR PRODUCING IMITATION CHEESE

[75] Inventor: Jerry L. Middleton, Wapakoneta, Ohio

[73] Assignee: Universal Foods Corporation, Milwaukee, Wis.

[*] Notice: The portion of the term of this patent subsequent to Apr. 8, 1997 has been disclaimed.

[21] Appl. No.: 553,733

[22] Filed: Nov. 21, 1983

Related U.S. Application Data

[63] Continuation of Ser. No. 299,429, Sep. 4, 1981, abandoned, which is a continuation-in-part of Ser. No. 71,150, Aug. 30, 1979, abandoned, which is a continuation-in-part of Ser. No. 907,437, May 19, 1978, Pat. No. 4,197,322, which is a continuation-in-part of Ser. No. 794,808, May 9, 1977, abandoned, which is a continuation-in-part of Ser. No. 525,549, Nov. 20, 1974, abandoned.

[51] Int. Cl.⁴ .............. A23C 19/04; A23C 19/055; A23C 19/06; A23C 20/00
[52] U.S. Cl. ........................ 426/39; 426/36; 426/582; 426/657
[58] Field of Search ............. 426/36, 39, 40, 580, 426/582, 657, 634

[56] References Cited

U.S. PATENT DOCUMENTS

| | | | |
|---|---|---|---|
| 3,694,219 | 9/1972 | Glandorf et al. | 426/634 |
| 4,075,360 | 2/1978 | Rule et al. | 426/582 |
| 4,104,413 | 8/1978 | Wynn et al. | 426/582 |
| 4,110,484 | 8/1978 | Rule et al. | 426/582 |
| 4,197,322 | 4/1980 | Middleton | 426/36 |
| 4,232,050 | 11/1980 | Rule et al. | 426/582 |

FOREIGN PATENT DOCUMENTS 2808303  8/1978  Fed. Rep. of Germany ...... 426/582
2002217  2/1979  United Kingdom .

OTHER PUBLICATIONS

Edible Rennet Casein, New Zealand Dairy Board, Wellington, New Zealand, Mar. 1977 (pp. 1–17).

Primary Examiner—David M. Naff
Attorney, Agent, or Firm—Donald A. Peterson; Herbert D. Hart, III

[57] ABSTRACT

Imitation cheese is made by admixing a hydrated casein curd produced by the action of a milk coagulating enzyme on a calcium salt of a milk casein with edible oil and an emulsifying agent with heating at an elevated temperature to form a homogeneous mixture. Preferably, the enzyme is rennet and heating is to above 140° F. An acid is preferably added to the heated mixture with vigorously admixing under homogenizing conditions to produce a homogeneous melted and pasteurized product.

24 Claims, No Drawings

PROCESS OF USING RENNET CASEIN FOR PRODUCING IMITATION CHEESE

CROSS REFERENCE TO RELATED APPLICATIONS

This is a continuation of my application Ser. No. 299,429, filed Sept. 4, 1981 now abandoned which is a continuation-in-part of my application Ser. No. 071,150 filed Aug. 30, 1979 now abandoned which is a continuation-in-part of Ser. No. 907,437, filed May 19, 1978, now U.S. Pat. No. 4,197,322, which is a continuation-in-part of Ser. No. 794,808, filed May 9, 1977, now abandoned, which, in turn is a continuation-in-part of my Ser. No. 525,549, filed Nov. 20, 1974, now abandoned.

BACKGROUND OF THE INVENTION

1. Field of the Invention

This field of the present invention is the manufacture of imitation cheese-like food products.

2. Brief Description of the Prior Art

The manufacture of natural dairy cheese conventionally involves the treatment of milk products, including inoculation with particular and specific strains of microorganisms, treatment with enzymes (especially coagulating enzymes of which rennin is the preferred enzyme) allowing a cheese curd to form, separating the cheese whey, collecting the cheese curd, and pressing of this curd into molds, followed by ripening and aging for various periods of time, depending upon the established standard of identity for the particular cheese product. These processes are described in detail in standard reference books such as "Cheese and Fermented Milk Foods", by F. V. Kosikowski published in 1966 by F. V. Kosikowski (printed and distributed by Edwards Bros., Inc., Ann Arbor, Mich.).

In view of the costs, both in respect to raw material and holding time involved in traditional procedures for natural cheese manufacture, the food industry has attempted to produce processed cheese or cheese-like food material which have a relatively high food value, similar in many cases to naturally produced cheese, at least with respect to the protein content thereof, and which, furthermore have the general taste and texture of natural cheese. The products are made from other edible foodgrade starting materials, preferably lower in cost than the milk products used for cheese manufacture. There has long been a need in the industry for such imitation cheeses which would be acceptable to the public from the point of view of taste, texture and nutritional value, especially when the cheese materials are used as a component or ingredient in traditional recipes which employ natural cheese such as, for example, salad dressings, pizzas, lasagna, omelets, cheese-flavored pastries and the like.

Some approaches producing such processed imitation or synthetic cheeses are as follows:

A synthetic cheese is described in U.S. Pat. No. 3,806,606, patented Apr. 23, 1974, which is prepared by homogenizing a composition containing 10 to 40% of a narrow melting range fat having a solid content index of less than 3 at 92° F. and from 15 to 25 at 70° F.; from 10 to 25% of wheat gluten; from 3 to 6% of egg white, from 3 to 6% gelatin, flavor and water followed by heat treatment to set the composition.

The product is said to have the eating qualities of natural cheese to a great extent and is a successful synthetic imitation of a natural dairy cheese product.

U.S. Pat. No. 3,694,219, patented Sept. 26, 1972, describes a spreadable food material from heat-treated soybean flour, water and a cheese processing salt. This product is sometimes mixed with additional cheese material and is described as having a taste or flavor similar to cheese.

An edible pasteurized process cheese composition is described in U.S. Pat. No. 3,244,535, which includes a homogeneous reaction mixture of cheese and an emulsifying proportion of sodium aluminum phosphate. This process, however, uses a natural cheese starting material to produce a processed cheese food which has good storage stability. A similar process is described in U.S. Pat. No. 3,615,586.

One of the difficulties with the prior art processes has been a cost problem since many of the techniques for making process cheese or imitation cheese involve the use of natural cheese materials which constitute a substantial portion of the imitation of synthetic cheese product. Obviously, the elimination of the natural dairy cheese or milk components would represent a cost savings over these processes. Likewise, many of the processes of the prior art rely on natural cheese products for a flavor or taste of the material and, therefore, present a problem from the point of view of uniformity of flavor and control over the composition of the final product. Finally, one of the difficulties of the prior art methods has been the obtaining of a synthetic or imitation cheese product which has uniformity of taste and texture normally associated with natural cheese products. Obviously, it is necessary to achieve these desiderata in order for the imitation cheese product to be acceptable to the consuming public.

SUMMARY OF THE INVENTION

The process of the present invention includes the production of an imitation cheese food product having the flavor and texture of natural dairy cheese, which process comprises admixing a hydrated rennet casein, with an edible oil to produce cheese-like products, or mixing commercial rennet casein, after hydrating, directly with an edible oil and suitable emulsifiers to produce essentially the same cheese-like products. It should be understood that by the use of the expression "hydrated rennet casein" it is intended to include rennet caseins broadly, which may be termed rennet coagulated casein, rennet casein curd, or calcium caseinate curd, all of which are fully equivalent alternatives of the term rennet casein. It should also be understood that hydrated rennet casein is the same as the equivalent of calcium caseinate curd obtained by the treatment of calcium caseinate with rennet as required in the process described in this application, and as disclosed in all of my earlier applications mentioned above.

From a practical point of view, rennet casein made from calcium caseinates prepared, in turn, from acid caseins by the process outlined in this and earlier applications is interchangeable with commercial rennet casein in the process for producing imitation cheese that is described in this and prior my applications to produce equivalent results insofar as the quality and composition of the imitation cheese products produced is concerned.

Rennet casein and the various acid caseins are significantly different in their physical and chemical properties, but treatment of calcium caseinates made from acid casein with the enzyme preparation rennet by the process described herein produces a rennet casein that functions the same as commercial rennet casein in the preparation of imitation cheese products by this process. The functional equivalence of these two sources of rennet casein is not surprising in view of the fact that the essential process in forming rennet casein is the displacement of a glycoma-cropeptide from the KAPPA-casein fraction of casein caused by the action of the enzyme rennin, and the consequent precipitation of the resulting paracasein in the presence of calcium ions (see for example the article by Dr. K. K. Fox on "Casein and Whey Proteins", published in the book, "By-Products from Milk", pp. 331-335, edited by B. H. Webb and E. O. Whittier and published by Avi Publishing Company, Westport, Conn. in 1970). The action is the same in the case of rennet treatment of calcium caseinate as prepared in the process described in this application. Small differences, if any, in the mineral content of rennet casein from these two sources is of trivial importance and can be compensated for, if desired, by rather small adjustments in the amounts of calcium and phosphate salts used to formulate the final synthetic cheese products.

Small amounts of appropriate vitamins and minerals can be added to the synthetic cheese products during the final stages of their preparation to achieve nutritional equivalence to natural cheeses. Normally, small amounts of suitable flavoring and coloring materials are added to increase the resemblance of the imitation cheese to their natural counterparts.

FORMATION OF RENNET CASEIN FROM ACID CASEINS

My earlier applications described above include a method of forming a rennet coagulated calcium casein curd relatively free of off odors and tastes from commercial acid caseins which had undesirable taste and odor factors. That process comprised:

(a) forming an aqueous suspension of an acid precipitated casein;

(b) reacting said suspension with a basic calciums salt to form a calcium caseinate solution;

(c) adding a milk coagulating rennet or rennet type enzyme to said solution to form a rennet casein coagulated calcium caseinate or rennet casein curd in an aqueous medium;

(d) separating the rennet casein curd from the aqueous medium; and (e) admixing the rennet casein curd with an edible oil.

The acid casein used in the above-described rennet casein curd-forming process can generally be acid casein from any source or type. Included within this group are acid caseins obtained by precipitation of casein solutions using non-toxic acids such as lactic, hydrochloric or sulfuric acids as the precipitating agent. These caseins are also referred to as isoelectric caseins. The casein may be in the form of a dry solid or a wet suspended solid.

In the formation of a rennet casein curd used in the process of making the imitation cheese of the present invention using an acid casein source, the basic calcium salt is preferably calcium hydroxide [$Ca(OH)_2$]. It has been determined that the reaction of basic calcium salts with casein takes place most readily in aqueous media, preferably at a pH of neutral (7) or in the basic range (pH above 7).

The ratio of basic calcium salt to casein employed in the amount required to produce the calcium caseinate, most usually at least about $7.5 \times 10^{-4}$ equivalents of a basic calcium salt [$Ca(OH)_2$] per gram of acid casein or more. A slight excess, i.e., 20%, is desirable in this process step. Generally, this minimum may be expressed as about 0.028 gram of calcium hydroxide per gram of casein, and with the noted excess of 20%, about 0.035 gram of calcium hydroxide per gram of casein. In one preferred form of this invention, the reaction of basic calcium salt with acid casein is carried out in the presence of a soluble, non-toxic, edible calcium salt of which calcium chloride is preferred. These calcium salts should preferably be neutral and not contribute to or produce adverse flavors in the final product. The use of such calcium salts enhances the properties of the curd and final synthetic cheese product providing superior body and melting characteristics. More particularly, the addition of the calcium salts optimizes certain properties of the resultant synthetic cheese such as the string and melt characteristics, as well as the opacity of the product. Thus, in mozzarella or cooking-type cheese used on pizzas or the like, the optimum "string" and melt are provided by a calcium salt such as calcium chloride. In the case where little or no string is required or desired, such as in the case of an imitation American cheese, no added calcium salt is used or required. It is believed that this beneficial result is because of additional cross-linkage provided by the calcium ions, but the exact mechanism is not known. The calcium chloride is added in varying amounts depending on casein concentration in the initial dispersion. Thus, at 3% casein levels, approximately 7 grams of $CaCl_2$ (dry basis) per gram of calcium hydroxide; and at 12% casein, approximately one gram of $CaCl_2$ per gram of $Ca(OH)_2$. More broadly, the calcium chloride may be employed at a ratio of 0.8 to 11 parts per part of calcium hydroxide at casein concentrations of from 3 to 15%.

The aqueous casein suspension is usually at a solids content of from about 2 or 3 to about 15%, but 3 to 9% is preferred, although higher solids contents (above 15%) can be employed, but handling is difficult at these higher concentrations.

Calcium caseinate formation is usually carried out at temperatures above room temperature, preferably 90°-100° F., although lower or higher temperatures can be used. The solubilization or reaction occurs by the formation of a milky solution or sol generally substantially free of observable solids. The time required varies with temperature, but in the preferred range is usually complete in from ½ to 1½ hours. Optimum time is ¾ to 1 hour at the preferred temperature of 90°-110° F., or in the most preferred 95°-100° F. range. Excessively high temperatures are to be avoided to prevent alteration of the casein but also because the subsequent curd formation by the use of enzymes typically occurs optimally at lower temperatures (below 110° F.) and this would require cooling. Moreover, the enzymes are inactivated by excessive heat, thereby precluding curd formation or rendering curd formation less efficient.

The calcium caseinate solution formed by the above procedure is then employed to form a rennet casein curd (i.e. calcium caseinate curd) by adding a curd-forming or milk-coagulating enzyme to the calcium caseinate solution. These enzymes are typically rennet or fungal, rennet being preferred. The rennet enzyme usually provides optimum results at 97° F. and at acid pH conditions. The temperatures can thus range from about 80° to 105° F., but 90°–100° F. is preferred.

The enzymes, such as the rennin found in rennet, are also characterized as being optimally effective at particular pH's. The preferred pH range for the enzymes is from about 5.9 to 6.9, preferably 6.0 to 6.5 with about 6.15 being optimum. Since the calcium caseinate formation requires an alkaline condition or media, it is necessary to acidify the media to achieve the optimum results in the curd-forming step which is best carried out in the acid range as noted above.

This pH adjustment may be accomplished by the use of edible non-toxic acids such as acetic and lactic or inorganic acids such as sulfuric or phosphoric acid, but acetic and phosphoric acid are preferred. Hydrochloric acid is not particularly suitable.

The total time required for curd formation will vary but generally from 30 seconds to 8 to 10 minutes is sufficient, although a longer time may be used. A short curd formation time period such as 2 to 3 minutes is preferred since it has been found that coarse particles of curd which filter and dewater more readily are rapidly formed and the coarse particles become finer with time. Thus, the time of curd formation may be expressed as a function of size and ease of dewaterability, the time when the dewaterable, readily filterable curd is formed being optimum. Dewatering of the curd may be accomplished by conventional methods, i.e., screening, decanting, filtering and the like. The dewatered rennet casein curd generally has a solids content of from 30 to 40%.

The formation of a calcium salt solution of the casein, followed by curd formation and dewatering of the resultant curd, provides a method of purifying commercially available acid caseins, usually available as dry solids, but also available as wet solid suspensions in water or whey. These acid or isoelectric caseins often have "off" odors or flavors associated with them and are by no means of standard purity or flavor. To provide a standard starting material for the synthetic or substituted cheeses, the above sequence of steps is employed and by that means a quality of flavor or taste in the final product is controlled or substantially assured. The solution-curd forming step results in the "off" flavors or odor factors being largely partitioned in the aqueous supernate of the curd formed and they are removed from the rennet casein curd in the dewatering step and discarded, leaving a relatively bland curd free of undesired flavors and tastes.

COMMERCIAL RENNET CASEIN

It should also be understood that my method of making a synthetic cheese may also employ a commercial rennet casein or a similar enzyme coagulated casein in lieu of the rennet casein curd produced from acid casein by the series of steps described above. The rennet casein should be essentially free of off odors and taste either by virtue of using a process such as that previously described for treatment of acid casein or by that virtue of carrying out the rennet coagulation using raw materials, i.e., skim milk, free of off odors and flavors. Commercial rennet caseins are normally shipped and sold in the dry state, and it is necessary to rehydrate these rennet caseins to form a hydrated rennet casein curd which is ultimately blended with fats and oils in the formation of the imitation cheese products. Typically commercially available rennet casein contains more of the milk minerals than does acid casein, but this is of no consequence in the context of the instant process as explained above. While reference is made to rennet as the precipitating enzyme, the precipitating enzyme may be of either animal or microbial origin. The rennet casein curd, or precipitate, is customarily washed, pressed, dried, ground and seived to produce a particulate uniform dry product ready for shipment or storage.

Commercially available rennet caseins are normally produced by the acidification of skim milk, followed by the addition of rennet to form a curd. The curd is normally then dried and granulated. To reconstitute the rennet curd for use in the process of the invention, one need only add water equivalent to that evaporated during the drying process. The rehydration or reconstitution is carried out by adding the casein to water and stirring. Normally, from about a few minutes to 24 hours are required for rehydration. Rehydration proceeds more rapidly in the presence of wetting agents and/or elevated temperatures. When a rehydrated or reconstituted rennet casein curd is used, it should contain a similar amount of moisture, i.e., 60 to 70%, as dewatered rennet curd produced by conventional rennet curd forming methods.

One useful commercially available dry, particulate rennet casein has a lactose content of about 0.1% to about 0.3% by weight and having a particle size of approximately 30 mesh. Preferably, the ash content of the dry particulate rennet casein that is used as the starting material is at least about 6% by weight and more preferably, about 7.5% by weight. One commercial source of suitable dry, particulate, edible rennet casein, is New Zealand Milk Products, Inc., 6300 River Road, Rosemont, Ill. A typical batch of this particular edible rennet casein has the following analysis:

|  | Percent (%) by weight |
|---|---|
| Moisture | 11.0 |
| Protein (N × 6.38) | 80.6 |
| Milkfat | 0.5 |
| Lactose | 0.1 |
| Mineral Salts (ash) | 7.8 |
|  | 100.0 |
| pH | 7.1 |

| Minerals and Trace Elements | Percent (%) by weight |
|---|---|
| Phosphorus | 1.3–1.4 |
| Magnesium | 0.10–0.12 |
| Sodium | 0.01–0.05 |
| Potassium | 0.01–0.04 |
| Iron | 2–6 mg/kg |

The term "hydrated" as used herein and in the appended claims characterizes previously dry, edible rennet casein that has been hydrated at an elevated temperature and dispersed in an aqueous system as a solution dispersion or gel.

Hydrated rennet casein prepared as described above, either from acid casein or commercial dry rennet casein, is included in the definition of rennet casein curd used in this application, and it may be used wherever rennet casein curd is called for herein.

PREPARATIONS OF IMITATION CHEESE FROM RENNET CASEIN CURD

The imitation cheese or cheese analog product is prepared by admixing the rennet casein curd, prepared by any of the procedures described in the preceding sections of this application, with an edible oil or fat and suitable food emulsifiers and salts in a sequence of blending steps. Edible oils are preferably those which have a Wiley melting point in the range of 70° to 115° F. Alternatively, the edible oils or fats may be further defined as those which have a Sold Fat Index (SFI) of the following ranges at the temperatures indicated.

|         | SFI    |
|---------|--------|
| 50° F.  | 20–75  |
| 70° F.  | 0–60   |
| 80° F.  | 0–50   |
| 92° F.  | 0–25   |
| 100° F. | 0–15   |
| 110° F. | 0      |

Preferably, the oil or fat is a vegetable oil or a blend of vegetable oils such as a mixture of soybean, cottonseed and coconut oils. A 100% soybean oil (hydrogenated) may also be used, as well as hydrogenated cottonseed oil or corn oil. Animal fats or oils may also be employed, such as butter, butter oil or lard.

The ratio of calcium caseinate curd to fat or oil is variable but generally the final synthetic cheese product should have a protein content (contributed by the casein) of from 20 to 30% by weight (as is basis). The moisture content of the dewatered curd is, of course, also variable, but usually is about 60 to 70% moisture, which should be taken into account in the blending of curd and oil (or fat) to make the final product. If a rehydrated or reconstituted rennet casein curd is used, it should contain a similar amount of moisture, i.e., 60 to 70%. The ratio of protein (casein in curd) to fat may vary, but generally from 1 to 1.5 parts of protein (dry basis) per part of fat or oil is satisfactory, although other ratios, i.e., 0.7 or 0.8 to 1.7 parts of protein (curd solids) comparable to the ratio of protein to fat found in natural cheeses may be used.

In one preferred procedure the final imitation cheese product is prepared in two mixing step sequences. In the first step, the curd, oil, salt and emulsifier are blended together at elevated temperatures, preferably above 140° F. to assure smooth melting and blending and most preferably temperatures of 165°–170° F., up to 180° F., for a short time, but sufficient to assure pasteurization are used. The time required is usually 1½ to 3 minutes, preferably from 2 to 2½ minutes. After the initial blending step, an acid is added to the mix. The acids used in order of preference are adipic, lactic, acetic and citric, but may also include other acids which are non-toxic and do not add an undesirable flavor note. The pH of the mix as adjusted by the acid should be 5 or above. After addition of the acid, the hot composition is subjected to further mixing under homogenizing conditions for a short time, i.e., 2 minutes, at elevated temperatues (165°–170° F.) to obtain a homogeneous, smooth blend.

The emulsifier preferably is a phosphate salt type such as sodium aluminum phosphate or the less preferred disodium phosphates or the like. Salt (NaCl) and other flavorants are added to taste.

Alternatively, the process of making imitation cheese products may be carried out in a single step procedure. In this method commercial rennet casein, fat and other additives such as emulsifiers, flavorants, etc., are admixed together, usually at elevated temperatures, i.e., 140°–170° F. Where a dry rennet casein is employed, it is necessary to add sufficient water to the mix to rehydrate the curd. If desired, the rennet casein may be rehydrated separately with or without emulsifiers and the rehydrated rennet casein curd then mixed with an edible oil (and emulsifiers if they were not previously added) in a single step or in sequential steps as noted above.

One of the unusual features of the present invention, as noted above, is that it permits the use of casein per se from any source. Ordinarily, acid caseins frequently have off-flavors and/or tastes which carry though to products incorporating it, and these off-flavors are considered undesirable by the consuming public. The process of the present invention, however, has a washing-/purifying action which removes these off-flavors or adverse flavor notes from an acid casein starting material and they do not appear in the final product. On the other hand, where a good quality dry rennet casein is available, the washing/purifying steps used with acid casein are not necessary.

DETAILED DESCRIPTION OF THE INVENTION

The following specific examples will illustrate the manufacture of a particular type of imitation cheese by the process of the present invention.

EXAMPLE 1

A synthetic mozzarella cheese was produced by the following procedure: One thousand grams of water was heated to between 95° and 97° F. To the heated water was added 0.85 gram of calcium hydroxide and 30 grams of acid casein. The suspension was maintained between 95° and 97° F. with stirring for a period of one hour at which time reaction between these two materials was complete. At this point, 1.9 grams of a 20% calcium chloride solution was added, the pH was adjusted to about 6.15 by the addition of phosphoric acid, and 0.4 ml of single strength rennet added. The mixture was then stirred for an addition of phosphoric acid, and 0.4 ml of single strength rennet added. The mixture was then stirred for an additional period of one-half hour at 95° to 97° F. At the end of this time a semi-solid, caseinate curd (or rennet casein curd) had formed which was dewatered to separate the curd solids. Sixty-seven grams of the dewatered curd (27 grams of calcium caseinate and 40 grams of water) was placed in a jacketed laboratory blender/cooker and and blended with 18.8 grams of emulsified vegetable oil (a blend of soybean oil, cottonseed oil and coconut oil), 1.5 grams of salt and 1.5 grams of sodium aluminum phosphate, and 5 grams of water to allow for evaporation during process. The mixture was heated with agitation and blending to 165°–170° F. When a smooth admixture was achieved, 1.2 grams of adipic acid was added to the heated, blended product to adjust the pH to 5.2 and the material stirred under homogenizing conditions until a totally homogeneous product was obtained (approximately 2 minutes). The hot product was then placed in a container and refrigerated.

The cooled product has a body and texture almost identical to that of natural mozzarella cheese with a relatively bland flavor. The product was stored under normal refrigeration conditions (cooler temperatures of about 45°.). Inspection of random samples of imitation mozzarella cheese product after three months indicated no change or deterioration of the product from the point of view of either flavor, body or texture.

The synthetic, imitation cheese product produced by the foregoing procedure was sufficiently close in flavor, body, texture and appearance to be used as a complete replacement for natural dairy mozzarella cheese.

Other examples of the process are as follows:

EXAMPLE 2

Example 1 was repeated, except that 30 grams of casein was reacted with 0.85 gram of calcium hydroxide and 7 grams (dry basis) of calcium chloride. Acetic acid was used in the coagulation step. The final product has similar excellent texture as the product of Example 1.

EXAMPLE 3

Example 2 was repeated in modified form using 1500 grams water, 45 grams casein, 1.58 grams of calcium hydroxide and no calcium chloride. The product produced was acceptable, however, melt and flow characteristics were not as desirable as achieved with product (Example 1 or 2) made with calcium chloride.

EXAMPLES 4 and 5

Following the general procedure of Example 2, an acceptable synthetic mozzarella was prepared by blending the curd with hydrogenated soybean oil on the following basis:

| Example 4 | 23 parts protein (curd solids) |
| | 22.5 parts oil |
| Example 5 | 27 parts protein (curd solids) |
| | 18.5 parts oil |

EXAMPLES 6 THROUGH 10

The following are examples of different blends of oils (consisting essentially of soybean and cottonseed oils) used in the process of Example 1 to prepare synthetic mozzarella cheese. The final products had the same excellent characteristics as the product of Example 1.

| | EXAMPLE | | | | |
|---|---|---|---|---|---|
| | 6 | 7 | 8 | 9 | 10 |
| WMP (°F.)[1] | 99 | 105 | 98 | 93 | 73.5 |
| Temperature °F. | SOLID FAT INDEX | | | | |
| 50 | 68 | 62 | 65 | 49 | 27 |
| 70 | 57 | 49 | 52 | 30 | 2 |
| 80 | 50 | 43 | 45 | 20 | 0 |
| 92 | 23 | 23 | 18 | 4 | 0 |
| 100 | 4 | 9 | 3 | 0.3 | 0 |
| 110 | 0 | 0 | 0 | 0 | 0 |

[1]Wiley Melting Point ±2° F.

The following are examples of production-type runs manufacturing an American and mozzarella synthetic cheese-type product.

EXAMPLE 11

An imitation process American cheese was produced by the following procedure. Five hundred and fifty pounds of water was heated to between 91° and 92° F. To the heated water was added 1 lb. 6 oz. of calcium hydroxide and 39 lbs. 14 oz. of lactic acid casein. The suspension, having a pH of 9.9, was maintained at 91°–22° F. with stirring for a period of 1½ hours, at which time reaction between these two materials was complete and a solution essentially free of observable solids was produced. No calcium chloride was added and the pH was adjusted to about 6.15 with acetic acid and 91 ml of single strength rennet added. The acidified mixture was then stirred for an additional period of 3 minutes at 91° to 92° F. At the end of this time a semi-solid, calcium caseinate curd (i.e. rennet casein curd) had formed which was dewatered to separate the curd solids. Ninety-one and one-half lbs. of the dewatered curd was placed in a jacketed pilot blender/cooker and blended with 35 lbs. of emulsified vegetable oil, 2.6 lbs. of salt, 2.0 lbs. disodium phosphate duohydrate and 3 lbs of water to allow for evaporation during process. The mixture was heated and blended with agitation to 165°–175° F. When a smooth blended admixture was achieved, 190 gm of adipic acid was added to the heated, blended product to the heated, blended product to adjust the pH to 5.2 and the material vigorously stirred under homogenizing conditions until a totally homogeneous product was obtained (approximately 5 minutes). The hot product was then placed in a container and refrigerated.

The cooled product has a body and texture almost identical to that of natural processed American cheese. The product was stored under normal refrigeration conditions (cooler temperatures of about 45° F.) Inspection of random samples of the imitation processed American cheese product after three months indicated no change or deterioration of the product from the point of view of either flavor, body or texture.

EXAMPLE 12

A synthetic mozzarella cheese was produced by the following procedure: Twenty thousand fifty pounds of water was heated to between 91° and 92° F. To the heated water was added 44 lbs of calcium hydroxide and 1212 lbs. lactic acid casein powder. The resulting acid casein suspension was mintained between 91° and 92° F. with stirring for a period of 1½ hours, at which time reaction between these two materials was complete resulting in a solution essentially free of observable solids. At this point 600 lbs of a 10% calcium chloride solution was added, the pH was adjusted to about 6.15 by the addition of 11.750 ml of glacial acetic acid, and 88 oz. of single strength rennet added. The mixture was then stirred for an additional period of three minutes to 91° to 92° F. At the end of this time a semi-solid, calcium caseinate curd (i.e. rennet casein curd) had formed which was dewatered to separate the curd solids. Seven hundred and twenty pounds of the dewatered curd (267 lbs. of calcium caseinate and 453 of water) was placed in a jacketed blender/cooker and blended with 225 lbs of emulsified vegetable oil, 20 lbs of salt, 15 lbs of sodium aluminum phosphate and 30 lbs of water to allow for evaporation during process. The mixture was heated and blended with agitation to 165°–170° F. When a smooth, blended admixture was achieved, 8.5 lbs. of adipic acid was added to the heated, blended product to adjust the pH to 5.2 and the material vigorously stirred under homogenizing conditions until a totally homogeneous product was obtained (approximately 5 minutes). The hot product was then placed in a container and refrigerated.

The cooled product has a body and texture almost identical to that of natural mozzarella cheese with a relatively bland flavor. The product was stored under normal refrigeration conditions (cooler temperatures of about 45° F.). Inspection of random samples of the synthetic mozzarella cheese product after three months indicated no change or deterioration of the product from the point of view of either flavor, body or texture.

EXAMPLE 13

Imitation mozzarella cheese was produced from rennet casein by the following procedure: One hundred grams of dry rennet casein, New Zealand Code 577, approximately 30 mesh, was placed in a 2 liter vessel equipped with a mechanical stirrer. To the rennet casein was added 300 ml of cold water. The contents of the vessel were tempered by heating to 113° F. (45° C.) and stirred overnight (15 hours) to rehydrate the casein. Excess water was drained from the rehydrated rennet casein and fresh 180° F. water added with brisk stirring for several minutes. The stretched casein was permitted to cool to room temperature. The rehydrated rennet casein curd had a moisture content of 57.50%. An imitation cheese was prepared using the following ingredients:

| | |
|---|---|
| Rennet Casein (rehydrated curd 57.5% water) | 75 parts |
| Durkee No. 4 Oil (hydrogenated vegetable oil) | 21 parts |
| Kasal (Sodium Aluminum Phosphate emulsifier) | 4 parts |
| Total | 100 parts |

The curd, oil and Kasal were melted together with mixing until smooth and permitted to cool.

The detailed methods set forth in the previous examples 1–12 may also be advantageously applied to the procedure of Example 13, including, particularly, the use of acidulants such as adipic acid to adjust the final pH of the imitation cheese product.

One of the aspects of the foregoing process is the formation of a rennet casein curd from acid casein, which curd is essentially free of off-tastes and odors associated with casein. A rennet casein curd, whether produced from acid casein by the foregoing method or reconstituted or rehydrated from commercial casein, has been found to be suitable for use as the protein component of imitation cheese products when mixed with edible fat or oil and other ingredients.

The process of the invention is suitable for preparing synthetic cheese-type food products which are suitable replacement for mozzarella, American cheddar and other types of cheeses form the point of view of taste, texture and nutritional value.

What is claimed is:

1. A process for producing an imitation cheese which comprises:
   (a) admixing a hydrated rennet casein with an edible oil, together with an edible, non-toxic emulsifying agent at a temperature of above 140° F. to produce a smooth blended admixture; and
   (b) adding an acid selected from the group consisting of adipic, lactic, acetic and citric acids to the hot blended product produced in step (a) to acidify the hot blended product to a pH of 5 or above and vigorously admixing the same under homogenizing conditions to produce a homogeneous melted and pasteurized product.

2. A process according to claim 1 wherein said edible oil has a Wiley Melting Point of from 70° to 115° F.

3. A process according to claim 2 wherein the hydrated rennet casein is admixed with the edible oil in a ratio of from about 0.7 to 1.7 parts of casein protein per part of oil on a dry weight basis.

4. A process according to claim 3 wherein said ration is from 1.0 to 1.5.

5. A process according to claim 1 wherein the hydrated rennet casein has a moisture content of about 60 to 70%.

6. A process according to claim 1 wherein salt is added to the admixture.

7. A process for producing an imitation cheese which consists essentially of:
   (a) admixing a dried rennet casein with water to form a rehydrated rennet casein.
   (b) admixing the rehydrated rennet casein produced by step (a) with an edible oil, and an edible, non-toxic emulsifying agent at a temperature above about 140° F. to produce a smooth blended admixture; and
   (c) adding an acid selected from the group consisting of adipic, lactic, acetic and citric acids to the blended product to a pH of 5 or above to the heated admixture for step (b) and vigorously admixing the same under homogenizing conditions to produce a homogenous melted and pasteurized imitation cheese product.

8. A process according to claim 7 wherein said edible oils has a Wiley Melting Point of from 70° to 115° F.

9. A process according to claim 7 wherein the hydrated curd is admixed with the edible oil in the ratio of from about 0.7 to 1.7 parts with casein protein per part of oil on a dry weight basis.

10. A process according to claim 9 wherein said ratio is from 1.0 to 1.5.

11. A process according to claim 7 wherein the moisture content of the reconstituted curd is from about 60% to about 70%.

12. A process according to claim 7 wherein salt is added to the admixture of step (b).

13. A process for producing an imitation cheese which comprises admixing a rennet coagulated casein with an edible oil and an emulsifying agent with heating at elevated temperatures to form a homogeneous mixture.

14. A process according to claim 13 wherein the emulsifying agent is an edible alkali metal phosphate.

15. A process according to claim 13 wherein the emulsifying agent is sodium aluminum phosphate.

16. A process according to claim 13 wherein the rennet casein is employed in amounts of from 0.7 to 1.7 parts of casein protein per part of edible oil.

17. A process according to claim 13 wherein salt and an acid selected from the group consisting of adipic, lactic, acetic and citric acids are added to the admixture.

18. A process according to claim 17 wherein the pH of the final product is adjusted to a pH of 5 or above.

19. A process according to claim 13 wherein the admixing is carried out at temperatures above 140° F.

20. An imitation cheese composition which exhibits the texture and flavor of natural cheese prepared by the process of claim 1.

21. A process for producing an imitation cheese which comprises admixing a hydrated casein curd produced by the action of a milk coagulating enzyme on a calcium salt of a milk casein with an edible oil and an emulsifying agent with heating at elevated temperatures to form a homogeneous mixture.

22. A process according to claim 21 wherein the milk coagulating enzyme is rennet.

23. A process for producing an imitation cheese which comprises:
(a) admixing a hydrated casein curd produced by the action of a milk coagulating enzyme on a calcium salt of a milk casein with an edible oil, together with an edible, non-toxic emulsifying agent at a temperature of above 140° F. to produce a smooth blended admixture; and
(b) adding an acid selected from the group consisting of adipic, lactic, acetic and citric acids to the hot blended product produced in step (a) to acidify the hot blended product to a pH of 5 or above and vigorously admixing the same under honogenizing conditions to produce a homogeneous melted and pasteurized product.

24. A process for producing an imitation cheese which comprises:
(a) admixing a hydrated rennet casein curd produced by the action of rennet on a calcium salt of milk casein with an edible oil, together with an edible, non-toxic emulsifying agent at a temperature of above 140° F. to produce a smooth blended admixture; and
(b) adding an acid selected from the group consisting of adipic, lactic, acetic and citric acids to the hot blended product produced in step (a) to acidify the hot blended product to a pH of 5 or above and vigorously admixing the same under homogenizing conditions to produce a homogeneous melted and pasteurized product.

* * * * *